(12) United States Patent
Chaen (10) Patent No.: US 10,797,291 B2
(45) Date of Patent: Oct. 6, 2020

(54) BUS BAR MODULE

(71) Applicant: YAZAKI CORPORATION, Tokyo (JP)

(72) Inventor: Takahiro Chaen, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 193 days.

(21) Appl. No.: 15/984,150

(22) Filed: May 18, 2018

(65) Prior Publication Data

US 2018/0337388 A1 Nov. 22, 2018

(30) Foreign Application Priority Data

May 19, 2017 (JP) .................................. 2017-099847

(51) Int. Cl.
*H01M 2/20* (2006.01)
*B60L 50/64* (2019.01)
*H01M 10/48* (2006.01)
*B60R 16/02* (2006.01)
*B60R 16/033* (2006.01)
*H01M 2/10* (2006.01)

(52) U.S. Cl.
CPC ............. *H01M 2/206* (2013.01); *B60L 50/64* (2019.02); *B60R 16/0215* (2013.01); *B60R 16/033* (2013.01); *H01M 2/1077* (2013.01); *H01M 10/482* (2013.01); *H01M 2220/20* (2013.01)

(58) Field of Classification Search
CPC .. H01M 2/206; H01M 2/1077; H01M 10/482; B60L 50/64; B60R 16/0215
See application file for complete search history.

(56) References Cited

U.S. PATENT DOCUMENTS

2011/0064987 A1 3/2011 Ogasawara et al.

FOREIGN PATENT DOCUMENTS

| JP | 2011-65863 A | 3/2011 |
| JP | 2015-138605 A | 7/2015 |
| JP | 2015138605 A * | 7/2015 |

OTHER PUBLICATIONS

H. Shimoda et al, Wiring module and power storage module, Jul. 30, 2015, Google Patents, English translation (Year: 2015).*
Japanese Office Action for the related Japanese Patent Application No. 2017-099847 dated Jul. 23, 2019.

* cited by examiner

*Primary Examiner* — Helen Oi K Conley
(74) *Attorney, Agent, or Firm* — Kenealy Vaidya LLP (57) ABSTRACT

A bus bar module includes an electric wire routing structure that is attached to an battery assembly including a plurality of battery cells and accommodates a plurality of bus bars in which each electrodes of the battery cells is electrically connected to each other, a plurality of electric wires connected to the battery cells via the bus bars, respectively, an electric wire routing groove formed in the electric wire routing structure and accommodating the electric wires in a pair of side walls, and a lid that is supported by a first side wall via a hinge and covers the electric wire routing groove to block a groove opening.

7 Claims, 5 Drawing Sheets

BUS BAR MODULE

CROSS REFERENCE TO RELATED APPLICATIONS

This application claims priority from Japanese Patent Application No. 2017-099847 filed on May 19, 2017, the entire contents of which are incorporated herein by reference.

BACKGROUND OF THE INVENTION

Field of the Invention

The present invention relates to a bus bar module.

Description of Related Art

A bus bar module is attached to a battery assembly mounted on a vehicle such as an electric vehicle or a hybrid vehicle. The bus bar module includes: plural bus bars that electrically connect battery cells of a battery assembly to each other; plural electric wires that are electrically connected to the respective battery cells through the bus bars; and an electric wire routing structure that accommodate the plural bus bars and routes the plural electric wires.

Figure 7:
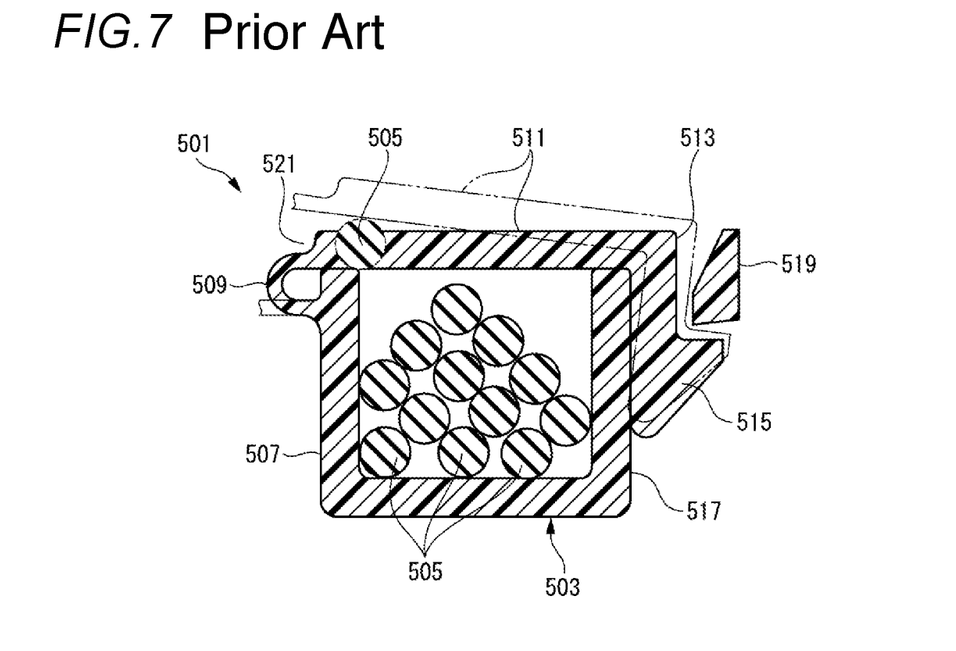
FIG. 7 is a cross-sectional view illustrating an electric wire routing structure of the related art.

As illustrated in FIG. 7, an electric wire routing structure 501 accommodates respective electric wires 505 in an electric wire routing groove 503 that is formed between a pair of side walls. The electric wire routing structure 501 includes a lid 511 that is supported by a first side wall 507 through a hinge 509 and covers the electric wire routing groove 503 to block a groove opening. The lid 511 includes an engaging pawl 515 in an opening/closing side edge 513 opposite to the hinge 509. The engaging pawl 515 engages with a pawl receiving portion 519 that is formed in an outer surface of a second side wall 517. The lid 511 is held in a state where it covers the electric wire routing groove 503 by the engaging pawl 515 engaging with the pawl receiving portion 519.

[Patent Document 1] JP-A-2011-65863

According to a related art, the hinge 509 is formed in a thin plate shape, and thus may be broken during rotation or the like for closing the lid 511. In a case where the hinge 509 is broken, the lid 511 floats from the electric wire routing groove 503 (a state indicated by an imaginary line in FIG. 7). In the electric wire routing structure 501, in a case where the lid 511 floats, the electric wire 505 may penetrate into a gap 521 between the first side wall 507 and the lid 511.

SUMMARY

One or more embodiments provide a bus bar module in which floating of a lid from an electric wire routing groove can be prevented even in a case where a hinge is broken.

In an aspect (1), a bus bar module includes an electric wire routing structure that is attached to an battery assembly including a plurality of battery cells and accommodates a plurality of bus bars in which each electrodes of the battery cells is electrically connected to each other, a plurality of electric wires connected to the battery cells via the bus bars, respectively, an electric wire routing groove formed in the electric wire routing structure and accommodating the electric wires in a pair of side walls, and a lid that is supported by a first side wall via a hinge and covers the electric wire routing groove to block a groove opening, an engaged portion formed on an opening/closing side edge of the lid opposite to the hinge, an engaging portion formed on an outer surface of a second side wall and with which the engaged portion is engaged, a sub-engaged portion formed on a support side edge of the lid forming the hinge, a sub-engaging portion formed on an outer surface of the first side wall and with which the sub-engaged portion is engaged, and a protrusion wall protruding from an inner surface of the first side wall opposite to the sub-engaging portion to the second side wall.

According to the aspect (1), the lid connected to the first side wall through the hinge covers the electric wire routing groove including the pair of side walls. The lid rotates about the hinge and is closed. The sub-engaged portion is formed in the support side edge where the hinge is formed. Therefore, the sub-engaged portion moves close to the electric wire routing groove before the engaged portion provided in the opening/closing side edge of the lid. In the inner surface of the first side wall to which the sub-engaged portion moves close, the protrusion wall protrudes to the second side wall. The protrusion wall restricts the sub-engaged portion from exceeding the first side wall and penetrating into the inner surface of the first side wall. In addition, in a state where the sub-engaged portion comes into contact with the protrusion wall, the further rotation of the lid is also restricted. The lid is rotatable by the sub-engaged portion being disposed in a position along the outer surface of the first side wall opposite to the protrusion wall. Due to the effect of preventing erroneous penetration of the sub-engaged portion obtained by the protrusion wall, non-engagement of the sub-engaged portion is prevented.

In the lid in which the groove opening is blocked, the engaged portion of the opening/closing side edge engages with the engaging portion formed in the outer surface of the second side wall. In addition, in the lid, the sub-engaged portion of the support side edge engages with the sub-engaging portion formed in the outer surface of the first side wall. In the lid, the sub-engaged portion is also provided in the support side edge on the hinge side. As a result, when the lid is closed, the lid is locked on opposite sides of the electric wire routing groove in the groove width direction. Accordingly, even in a case where the hinge is broken, the floating of the lid from the electric wire routing groove is prevented.

The protrusion wall protrudes in a direction in which the protrusion wall crosses the groove opening above the electric wire accommodated in the electric wire routing groove. Therefore, the floating of the electric wire from the electric wire routing groove can also be restricted.

In an aspect (2), a pair of the engaged portion and the engaging portion, and a pair of the sub-engaged portion and the sub-engaging portion are formed in different positions in an extending direction of the electric wire routing groove.

According to the aspect (2), the engaged portion and the engaging portion, and the sub-engaged portion and the sub-engaging portion are disposed distant from each other in the extending direction of the electric wire routing groove. The engaged portion and the engaging portion, and the sub-engaged portion and the sub-engaging portion are disposed on the second side wall side and the first side wall side, respectively, and are disposed distant from each other in the extending direction of the electric wire routing groove. Therefore, the engaged portion and the engaging portion, and the sub-engaged portion and the sub-engaging portion are disposed on diagonal lines of the lid having a square shape. By the engaged portion and the sub-engaged portion being disposed on the diagonal line in the lid, the floating of the lid can be prevented over a wide region in the longitudinal direction with a small number of locks.

According to one or more embodiments, floating of a lid from an electric wire routing groove can be prevented even in a case a hinge is broken.

Hereinabove, the present invention has been briefly described. Further, an embodiment of the present invention will be described with reference to the accompanying drawings in order to further clarify the details of the present invention.

DETAILED DESCRIPTION

Hereinafter, an embodiment of the present invention will be described with reference to the drawings.

Figure 1:
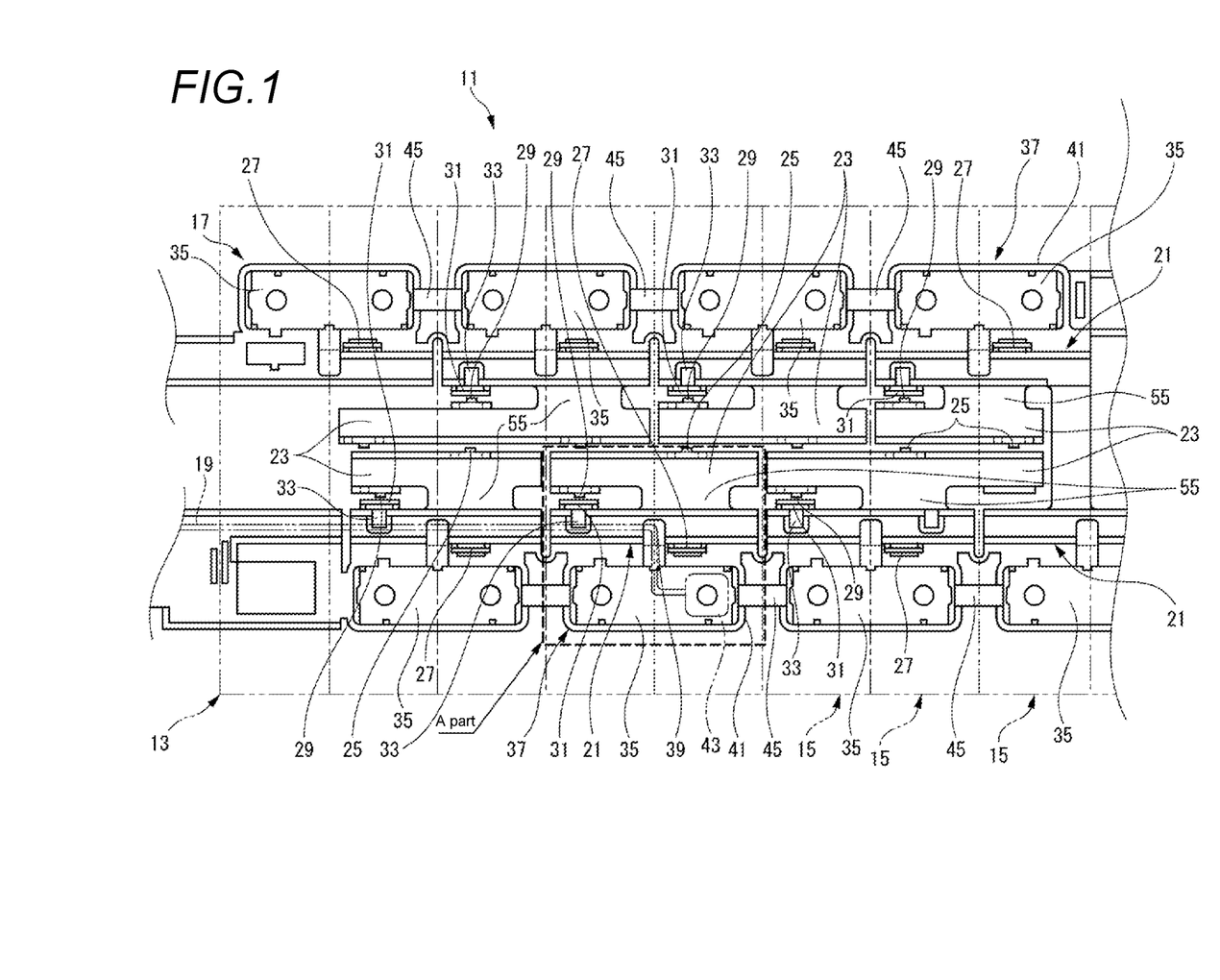
FIG. 1 is a plan view illustrating major components of a bus bar module according to an embodiment of the present invention.

FIG. 1 is a plan view illustrating major components of a bus bar module 11 according to an embodiment of the present invention.

The bus bar module 11 according to the embodiment is attached to a battery assembly 13 of a power supply unit (not illustrated) mounted on an electric vehicle that travels using an electric motor or a hybrid vehicle that travels using an engine and an electric motor together.

The battery assembly 13 includes plural battery cells 15 that are disposed in a row and are fixed to each other. Each of the battery cells 15 includes: a rectangular battery main body; and a pair of electrodes (not illustrated) that protrude from one end and the other end of one surface of the battery main body, respectively. Among the pair of electrodes, one electrode is a positive electrode, and the other electrode is a negative electrode. In the respective battery cells 15, surfaces where the pair of electrodes are provided face the same direction. The bus bar module 11 is attached to overlap a surface of the battery assembly 13 where the electrodes are provided.

The bus bar module 11 according to the embodiment mainly includes, as major components, an electric wire routing structure 17 formed of an insulating resin, an electric wire 19, an electric wire routing groove 21, a lid 23, an engaging pawl 25 as an engaged portion, a pawl receiving portion 27 as an engaging portion, a sub-engaging pawl 29 as a sub-engaged portion, a sub-pawl receiving portion 31 as a sub-engaging portion, and a protrusion wall 33.

The electric wire routing structure 17 is attached to the battery assembly 13 including plural battery cells 15 and accommodates plural bus bars 35 through which respective electrodes of the battery cells 15 are electrically connected to each other. For example, the electric wire routing structure 17 includes: a bus bar accommodation portion 37 that is integrally formed using a synthetic resin or the like; an electric wire routing groove 21; and a connecting groove 39.

The bus bar 35 is attached to the positive electrode and the negative electrode of the adjacent battery cells 15 of the battery assembly 13. As a result, the battery cells 15 are connected to each other in series. The bus bar 35 is obtained by pressing a conductive metal plate. In the bus bar 35, a pair of holes through which the positive electrode and the negative electrode of the battery cells 15 pass are provided in a substantially rectangular metal plate. The pair of holes are disposed along a longitudinal direction of the bus bar 35 at the same distance as that between the positive electrode and the negative electrode of the adjacent battery cells 15. In addition, by fastening nuts (not illustrated) to the positive electrode and the negative electrode that have passed through the holes, the bus bar 35 is attached to the battery cells 15 and is electrically connected to the positive electrode and the negative electrode.

The bus bar accommodation portion 37 includes: a bottom wall having a substantially rectangular shape that is substantially the same as that of the bus bar 35; and a peripheral wall portion 41 that vertically extends from a periphery of the bottom wall. The bus bar accommodation portion 37 is formed in a substantially vessel shape. In the bottom wall, a pair of holes (not illustrated) that overlap the pair of holes of the bus bar 35 are provided. In an inner surface of the bottom wall (that is, a surface surrounded by the peripheral wall portion 41), the bus bar 35 and the voltage detection terminal 43 sequentially overlap each other. That is, one bus bar 35 and one voltage detection terminal 43 are accommodated in the bus bar accommodation portion 37. The positive electrode and the negative electrode of each of the battery cells 15 sequentially pass through the pair of holes of the bottom wall and the holes of the bus bar 35. Further, either the positive electrode or the negative electrode passes through a hole of the voltage detection terminal 43. The plural bus bar accommodation portions 37 are disposed in a row such that a longitudinal direction thereof follows a disposition direction of the plural battery cells 15, and are connected to each other through connecting members 45.

The connecting member 45 is a hinge that has a semi-cylindrical shape having a C shape in cross-section and is formed to be elastically deformable. A pair of opposite edges of the connecting member 45 are connected to the peripheral wall portions 41 facing each other in the bus bar accommodation portions 37 adjacent to each other. By elastically deforming the connecting members 45, the distance between the bus bar accommodation portions adjacent to each other can be reduced or increased and a shape error of each of the battery cells 15, the electric wire routing structure 17, or the like can be accommodated. Due to this accommodation effect, assembly workability of a power supply unit can be improved.

Figure 2:
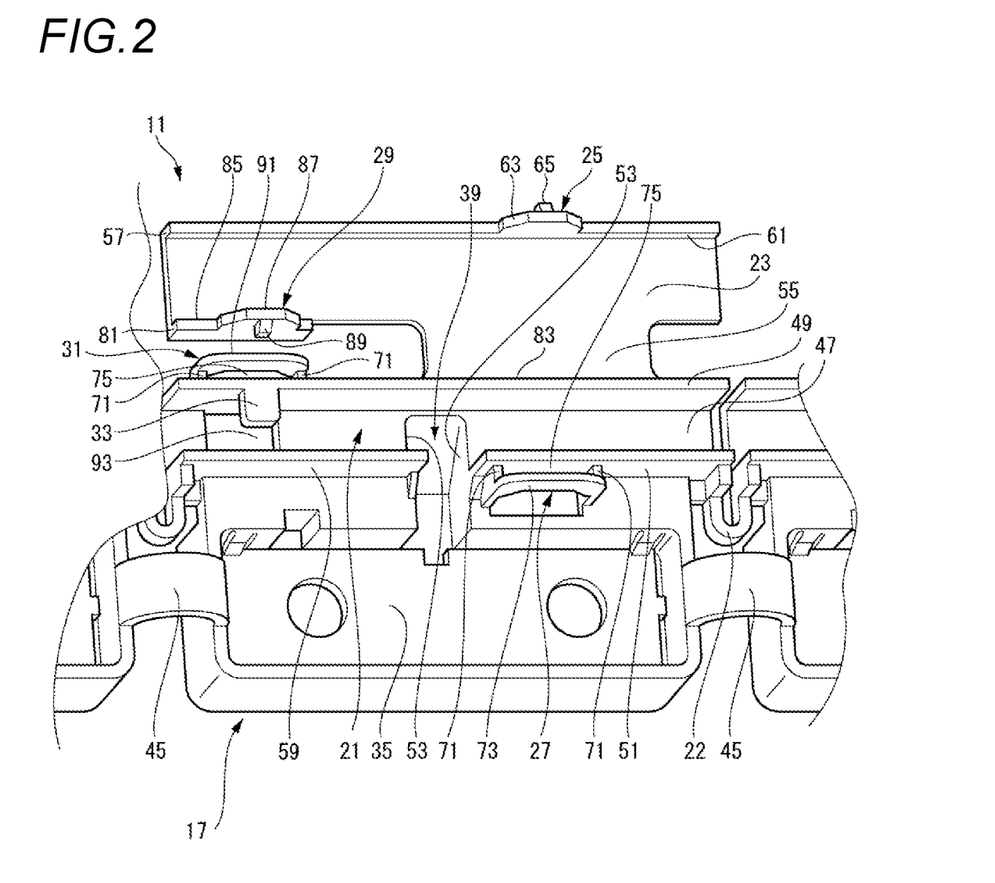
FIG. 2 is an enlarged perspective view illustrating a portion A in the electric wire routing groove illustrated in FIG. 1.

FIG. 2 is an enlarged perspective view illustrating a portion A in the electric wire routing groove 21 illustrated in FIG. 1.

The electric wire routing groove 21 includes: an elongated rectangular bottom wall 47; and a pair of side walls (a first side wall 49 and a second side wall 51) that vertically extend from opposite edges of the bottom wall 47 facing each other in a width direction. The electric wire routing groove 21 is formed in a groove shape (gutter shape).

The electric wire routing groove 21 accommodates plural electric wires 19 (refer to FIG. 3) between the first side wall 49 and the second side wall 51. The electric wire routing grooves 21 are disposed in a direction (left-right direction in FIG. 1) in which the plural bus bar accommodation portions 37 are disposed.

The connecting groove 39 includes a pair of connecting wall portions 53 and is formed in a gutter shape. The connecting groove 39 is provided to connect the bus bar accommodation portion 37 and the electric wire routing groove 21 to each other. The electric wire 19 connected to the voltage detection terminal 43 is disposed in the connecting groove 39.

The electric wire 19 is connected to each of the battery cells 15 through the bus bar 35. The electric wire is a well-known covered electric wire including: a conductive core wire; and an insulating coating that covers the core wire. In one end of the electric wire 19, the insulating coating is peeled off, and the core wire is exposed. One end of the electric wire 19 is electrically connected to the voltage detection terminal 43. The other end of the electric wire 19 is connected to a voltage detection circuit or the like included in an electronic control unit (ECU; not illustrated). The ECU detects the remaining amount or the state of charge of each of the battery cells 15 based on a potential difference (voltage) between the pair of electrodes of each of the battery cells 15 that is detected by the voltage detection circuit.

The lid 23 is supported by the first side wall 49 through a hinge 55 and covers the electric wire routing groove 21 to block a groove opening. In the embodiment, the lid 23 is formed in a rectangular plate shape. In addition, the hinge 55 is a thin plate-shaped flexible portion that is integrally formed across the lid 23 and the first side wall 49.

Figure 3:
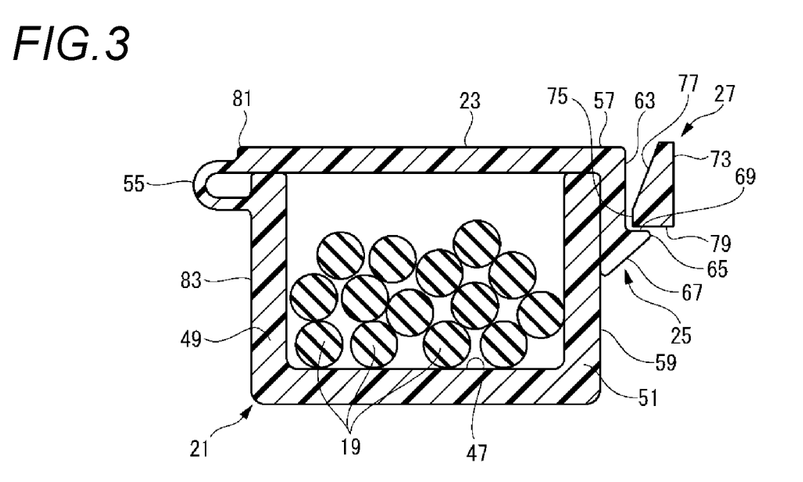
FIG. 3 is a cross-sectional view taken at a hinge position in the electric wire routing groove.

FIG. 3 is a cross-sectional view taken at a hinge 55 position in the electric wire routing groove 21

The engaging pawl 25 is an engaged portion that is formed in an opening/closing side edge 57 opposite to the hinge 55 of the lid 23. A draining wall 61 of the lid 23 parallel to an outer surface 59 of the second side wall 51 is formed in the opening/closing side edge 57 across a longitudinal direction (left-right direction in the drawing) of the lid 23. The engaging pawl 25 is formed to protrude from a part of the draining wall 61 parallel to the outer surface 59. The engaging pawl 25 includes an engaging pawl main body 63 and a pawl portion 65. In a state where the lid 23 covers the electric wire routing groove 21, the pawl portion 65 is formed to protrude from an engaging pawl main body surface opposite to the second side wall 51. The pawl portion 65 includes a tapered surface 67 that is formed on a tip end side of a closing operation of the lid 23 such that the thickness of the pawl portion 65 decreases toward the tip end. On the rear side of the tapered surface 67, an engaging surface 69 perpendicular to the outer surface 59 is formed. The engaging surface 69 of the engaging pawl 25 engages with the pawl receiving portion 27.

The pawl receiving portion 27 is formed in the outer surface 59 of the second side wall 51. The engaging pawl 25 engages with the pawl receiving portion 27. The pawl receiving portion 27 includes a leg portion 71 and an engaging plate 73. The engaging plate 73 is disposed parallel to the outer surface 59 of the second side wall 51. Opposite ends of the engaging plate 73 in an extending direction of the electric wire routing groove 21 (left-right direction in FIG. 2) are integrally formed with the outer surface 59 of the second side wall 51 by a pair of leg portions 71. Accordingly, a rectangular engaging hole 75 (refer to FIG. 2) surrounded by the outer surface 59, the engaging plate 73, and the pair of leg portions 71 is formed between the engaging plate 73 and the outer surface 59. The engaging hole 75 receives the engaging pawl 25. The engaging plate 73 allows a small amount of deformation in a direction away from the outer surface 59 due to elasticity (flexibility) of a synthetic resin material. In the engaging plate 73, an inclined guide surface 77 that gradually moves close to the outer surface 59 in an insertion direction of the engaging pawl 25 is formed. During closing of the lid 23, the inclined guide surface 77 slides with a tip end of the engaging pawl 25 in contact with the inclined guide surface 77 so as to guide the engaging pawl 25 in a direction in which the engaging pawl 25 penetrates the engaging hole 75. In the engaging plate 73, an engaging end surface 79 perpendicular to the outer surface 59 is formed on the penetration side of the engaging pawl 25. After the engaging pawl 25 penetrates the engaging hole 75, the engaging surface becomes caught with (engages with) the engaging end surface 79 such that removal of the engaging pawl 25 from the engaging hole 75 is restricted (locked).

Figure 4:
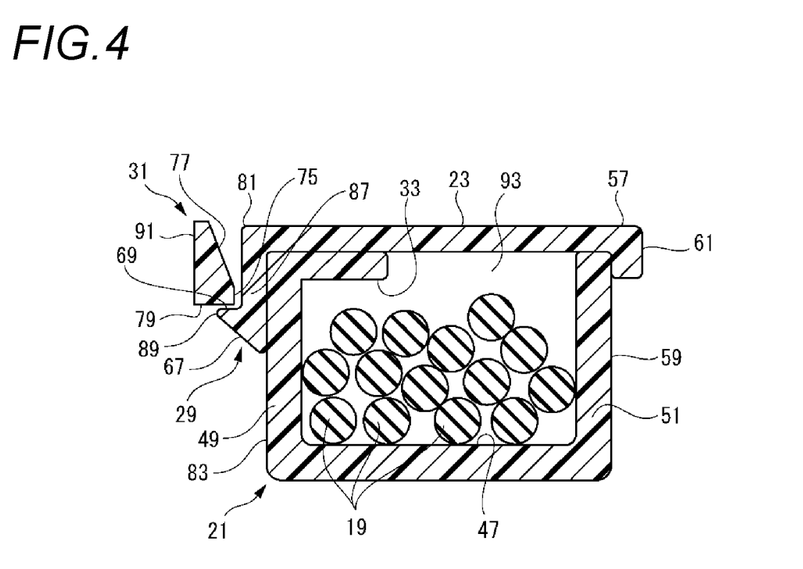
FIG. 4 is a cross-sectional view taken at a sub-engaged portion position in the electric wire routing groove.

FIG. 4 is a cross-sectional view taken at a sub-engaging pawl 29 position in the electric wire routing groove 21.

The sub-engaging pawl 29 is a sub-engaged portion that is formed in a support side edge 81 of the lid 23 where the hinge 55 is formed. The sub-engaging pawl 29 protrudes from the lid 23 by substantially the same length as that of the engaging pawl 25. In the lid 23, a rib piece 85 (refer to FIG. 2) parallel to the outer surface 83 of the first side wall 49 is formed in the support side edge 81. The sub-engaging pawl 29 is formed to protrude from a part of the rib piece 85 parallel to the outer surface 83. The sub-engaging pawl 29 includes a sub-engaging pawl main body 87 and a sub-pawl portion 89. In a state where the lid 23 covers the electric wire routing groove 21, the sub-pawl portion 89 is formed to protrude from a sub-engaging pawl main body surface opposite to the first side wall 49. The sub-pawl portion 89 includes a tapered surface 67 that is formed on a tip end side of a closing operation of the lid 23 such that the thickness of the sub-pawl portion 89 decreases toward the tip end. On the rear side of the tapered surface 67, an engaging surface 69 perpendicular to the outer surface 83 is formed. The engaging surface 69 of the sub-engaging pawl 29 engages with the sub-pawl receiving portion 31.

The sub-pawl receiving portion 31 is formed in the outer surface 83 of the first side wall 49. The sub-engaging pawl 29 engages with the sub-pawl receiving portion 31. The sub-pawl receiving portion 31 includes a leg portion 71 and a sub-engaging plate 91. The sub-engaging plate 91 is disposed parallel to the outer surface 83 of the first side wall 49. Opposite ends of the sub-engaging plate 91 in the extending direction of the electric wire routing groove 21 (left-right direction in FIG. 2) are integrally formed with the outer surface 83 of the first side wall 49 by a pair of leg portions 71. Accordingly, a rectangular engaging hole 75 (refer to FIG. 2) surrounded by the outer surface 83, the sub-engaging plate 91, and the pair of leg portions 71 is formed between the sub-engaging plate 91 and the outer surface 83. The engaging hole 75 receives the sub-engaging pawl 29. The sub-engaging plate 91 allows a small amount of deformation in a direction away from the outer surface 59 due to elasticity (flexibility) of a synthetic resin material. In the sub-engaging plate 91, an inclined guide surface 77 that gradually moves close to the outer surface 83 in an insertion direction of the sub-engaging pawl 29 is formed. During closing of the lid 23, the inclined guide surface 77 slides with a tip end of the sub-engaging pawl 29 in contact with the inclined guide surface 77 so as to guide the sub-engaging pawl 29 in a direction in which the sub-engaging pawl 29 penetrates the engaging hole 75. In the sub-engaging plate 91, an engaging end surface 79 perpendicular to the outer surface 83 is formed on the penetration side of the sub-engaging pawl 29. After the sub-engaging pawl 29 penetrates the engaging hole 75, the engaging surface 69 becomes caught with (engages with) the engaging end surface such that removal of the engaging pawl 25 from the engaging hole 75 is restricted (locked).

In the bus bar module 11, as illustrated in FIG. 2, the engaging pawl 25 and the pawl receiving portion 27, and the sub-engaging pawl 29 and the sub-pawl receiving portion are formed in different positions in the extending direction of the electric wire routing groove 21. The engaging pawl 25 and the pawl receiving portion 27 are disposed on an imaginary transverse line crossing the electric wire routing groove 21 in a groove width direction. In addition, the sub-engaging pawl 29 and the sub-pawl receiving portion 31 are disposed on another imaginary transverse line parallel to the imaginary transverse line crossing the electric wire routing groove 21 in the groove width direction. That is, in a plan view, the engaging pawl 25 and the pawl receiving portion 27, and the sub-engaging pawl 29 and the sub-pawl receiving portion 31 are disposed on diagonal lines (diagonal positions) of a square shape that is formed by the first side wall 49, the second side wall 51, and the pair of imaginary transverse lines.

Further, the bus bar module 11 includes the protrusion wall 33. The protrusion wall 33 protrudes from an inner surface of the first side wall 49 opposite to the sub-pawl receiving portion 31 in the groove width direction of the electric wire routing groove 21. That is, the sub-pawl receiving portion 31 and the protrusion wall 33 are disposed on the other imaginary transverse line. The protrusion wall is formed in a plate shape, and thus horizontally protrudes from the vicinity of an upper edge of the first side wall 49 to the second side wall 51 opposite to the first side wall 49. A gap 93 having a larger dimension than the outer diameter of the electric wire 19 is formed between the protrusion wall 33 and the second side wall 51. This gap 93 allows insertion of the electric wire 19 into the electric wire routing groove 21. When the lid 23 rotates in a closing direction, the protrusion wall 33 can come into contact with the sub-engaging pawl 29.

Originally, when the lid 23 is closed, the sub-engaging pawl 29 penetrates the engaging hole 75. In the lid 23, the sub-engaging pawl 29 may be removed from the engaging hole 75 due to forcible deformation or the like of the hinge 55. At this time, the protrusion wall 33 comes into contact with the tip end of the sub-engaging pawl 29. The protrusion wall 33 prevents the sub-engaging pawl 29 from exceeding the first side wall 49 of the electric wire routing groove 21 and penetrating the inside of the electric wire routing groove 21 due to the contact.

In addition, the protrusion wall 33 can suppress the floating of the electric wire 19 accommodated in the electric wire routing groove 21. As a result, the protrusion wall 33 also has a function of reducing a pressing operation of the floating electric wire 19 to improve workability.

Next, the assembly procedure of the bus bar module 11 will be described.

First, the bus bar 35 and the voltage detection terminal 43 to which the electric wire 19 is attached in advance are sequentially accommodated in the bus bar accommodation portion 37. The electric wire 19 attached to the voltage detection terminal 43 is accommodated in the electric wire routing groove 21. By rotating each lid 23 to bend the hinge 55, the lid 23 covers the electric wire routing groove 21 to block the groove opening. At this time, the sub-engaging pawl 29 is inserted into the engaging hole 75 provided in the sub-pawl receiving portion 31. The engaging pawl 25 is inserted into the engaging hole 75 provided in the pawl receiving portion 27.

The lid 23 rotates around the hinge 55. Therefore, in the configuration in which the engaging pawl 25 and the sub-engaging pawl 29 protrude by the same length, the sub-engaging pawl 29 positioned inside a rotation radius is inserted into the engaging hole 75 of the first side wall 49 first. Next, the engaging pawl 25 is inserted into the engaging hole 75 of the second side wall 51.

At this time, in a case where the sub-engaging pawl 29 is removed from the engaging hole 75 due to forcible deformation or the like of the hinge 55 so as to penetrate into the first side wall 49, the sub-engaging pawl 29 comes into contact with the protrusion wall 33. By the sub-engaging pawl 29 coming into contact with the protrusion wall 33, the further rotation of the lid 23 is restricted. In a state where the rotation is restricted, an operator finds out erroneous penetration of the sub-engaging pawl 29 into the electric wire routing groove 21.

The lid 23 can be closed by inserting the sub-engaging pawl 29 removed from the engaging hole 75 of the sub-pawl receiving portion 31 into the engaging hole 75 again. In a case where the lid 23 rotates up to a position where the lid 23 comes into contact with upper edges of the pair of side walls 49 and 51 of the electric wire routing groove 21, the engaging pawl 25 and the sub-engaging pawl 29 engage with the pawl receiving portion 27 and the sub-pawl receiving portion 31, respectively, and are fixed (locked) in a state where the groove opening of the electric wire routing groove is blocked. This way, the bus bar module 11 is constructed.

Next, the effect of the above-described configuration will be described.

Figure 5:
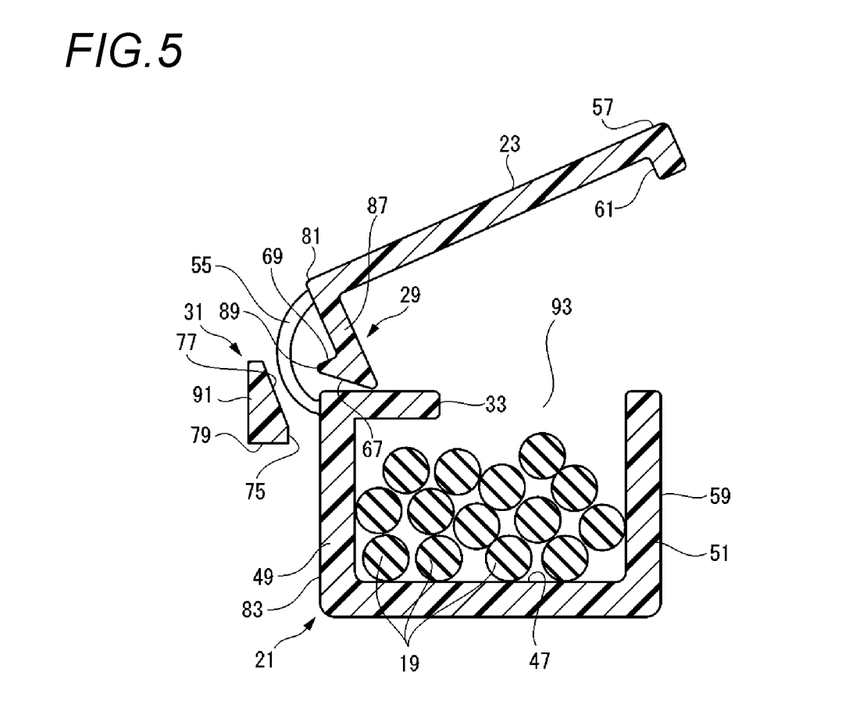
FIG. 5 is a cross-sectional view of an electric wire routing structure illustrating a state where a sub-engaged portion of a lid comes into contact with a protrusion wall.

FIG. 5 is a cross-sectional view of the electric wire routing structure 17 illustrating a state where the sub-engaging pawl 29 of the lid 23 comes into contact with the protrusion wall 33.

In the bus bar module 11 according to the embodiment, the lid 23 connected to the first side wall 49 through the hinge 55 covers the electric wire routing groove 21 including the pair of side walls 49 and 51. The lid 23 rotates about the hinge 55 and is closed. The sub-engaging pawl 29 is formed in the support side edge 81 where the hinge 55 is formed. Therefore, the sub-engaging pawl 29 moves close to the electric wire routing groove 21 before the engaging pawl 25 provided in the opening/closing side edge 57 of the lid 23. In the inner surface of the first side wall 49 to which the sub-engaging pawl 29 moves close, the protrusion wall 33 protrudes to the second side wall 51. The protrusion wall 33 restricts the sub-engaging pawl 29 from exceeding the first side wall 49 and penetrating into the inner surface of the first side wall 49. In addition, in a state where the sub-engaging pawl 29 comes into contact with the protrusion wall 33, the further rotation of the lid 23 is also restricted. The lid 23 is rotatable by the sub-engaging pawl 29 being disposed in a position along the outer surface 59 of the first side wall 49 opposite to the protrusion wall 33. Due to the effect of preventing erroneous penetration of the sub-engaging pawl 29 obtained by the protrusion wall 33, non-engagement of the sub-engaging pawl 29 is prevented.

Figure 6:
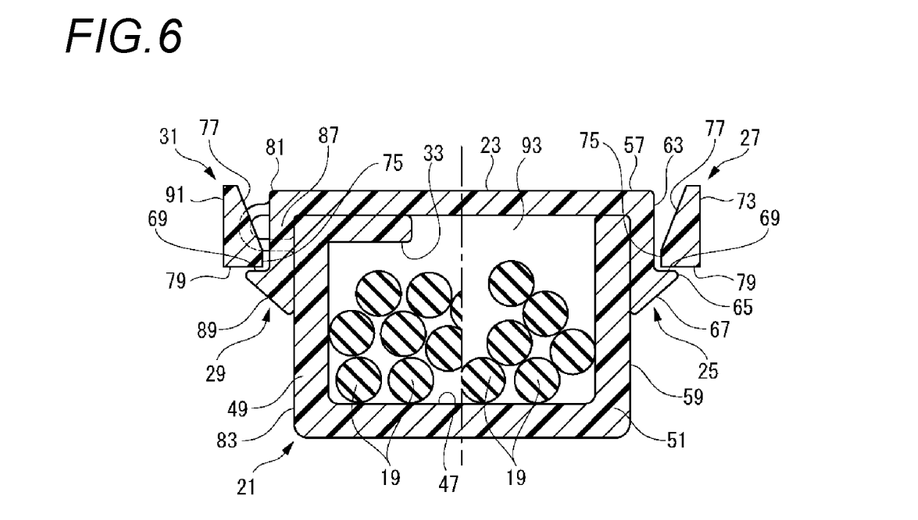
FIG. 6 is a cross-sectional view taken at a position of an electric wire routing groove in which left and right sides around a center line are different from each other.

FIG. 6 is a cross-sectional view taken at a position of the electric wire routing groove 21 in which left and right sides around a center line are different from each other.

In the lid 23 in which the groove opening is blocked, the engaging pawl 25 of the opening/closing side edge 57 engages with the pawl receiving portion 27 formed in the outer surface 59 of the second side wall 51. In addition, in the lid 23, the sub-engaging pawl 29 of the support side edge 81 engages with the sub-pawl receiving portion 31 formed in the outer surface 83 of the first side wall 49. In the lid 23, the sub-engaging pawl 29 is also provided in the support side edge 81 on the hinge side. As a result, when the lid 23 is closed, the lid 23 is locked on opposite sides of the electric wire routing groove 21 in the groove width direction. Accordingly, even in a case where the hinge 55 is broken, the floating of the lid 23 from the electric wire routing groove 21 is prevented.

The protrusion wall 33 protrudes in a direction in which the protrusion wall 33 crosses the groove opening above the electric wire 19 accommodated in the electric wire routing groove 21. Therefore, the floating of the electric wire 19 from the electric wire routing groove 21 can also be restricted.

In the bus bar module 11, the engaging pawl 25 and the pawl receiving portion 27, and the sub-engaging pawl 29 and the sub-pawl receiving portion 31 are disposed distant from each other in the extending direction of the electric wire routing groove 21. The engaging pawl 25 and the pawl receiving portion 27, and the sub-engaging pawl 29 and the sub-pawl receiving portion 31 are disposed on the second side wall 51 side and the first side wall 49 side, respectively, and are disposed distant from each other in the extending direction of the electric wire routing groove 21. Therefore, the engaging pawl 25 and the pawl receiving portion 27, and the sub-engaging pawl 29 and the sub-pawl receiving portion 31 are disposed on diagonal lines of the lid 23 having a square shape. By the engaging pawl 25 and the sub-engaging pawl 29 being disposed on the diagonal line in the lid 23, the floating of the lid 23 can be prevented over a wide region in the longitudinal direction with a small number of locks. That is, the number of the engaging pawls and the number of the sub-engaging pawls 29 can be minimized.

Accordingly, with the bus bar module 11 according to the embodiment, the floating of the lid 23 from the electric wire routing groove 21 can be prevented even in a case the hinge 55 is broken.

The present invention is limited to the above-described embodiment, and modifications, improvements, and the like can be appropriately made. In addition, the materials, shapes, dimensions, numbers, disposition positions, and the like of various components in the embodiment are arbitrary and are not particularly limited as long as the present invention can be achieved.

Here, the characteristics of the embodiment of the bus bar module according to the present invention will be collectively and briefly described in the following [1] and [2].

[1] A bus bar module (11) comprising:
an electric wire routing structure (17) that is attached to an battery assembly (13) including a plurality of battery cells (15) and accommodates a plurality of bus bars (35) in which respective electrodes of the battery cells (15) are electrically connected to each other;
a plurality of electric wires (19) connected to the battery cells (15) via the bus bars (35), respectively;
an electric wire routing groove (21) formed in the electric wire routing structure (17) and accommodating the electric wires (19) in a pair of side walls (49, 51);
a lid (23) that is supported by a first side wall (49) via a hinge (55) and covers the electric wire routing groove (21) to block a groove opening;
an engaged portion (engaging pawl 25) formed on an opening/closing side edge (57) of the lid (23) opposite to the hinge (55);
an engaging portion (pawl receiving portion 27) formed on an outer surface (59) of a second side wall (51) and with which the engaged portion (engaging pawl 25) is engaged;
a sub-engaged portion (sub-engaging pawl 29) formed on a support side edge (81) of the lid (23) forming the hinge (55);
a sub-engaging portion (sub-pawl receiving portion 31) formed on an outer surface (83) of the first side wall (49) and with which the sub-engaged portion (sub-engaging pawl 29) is engaged; and
a protrusion wall (33) protruding from an inner surface of the first side wall (49) opposite to the sub-engaging portion (sub-pawl receiving portion 31) to the second side wall (51).

[2] The bus bar module (11) according to [1], wherein a pair of the engaged portion (engaging pawl 25) and the engaging portion (pawl receiving portion 27), and a pair of the sub-engaged portion (sub-engaging pawl 29) and the sub-engaging portion (sub-pawl receiving portion 31) are formed in different positions in an extending direction of the electric wire routing groove (21).

DESCRIPTION OF REFERENCE NUMERALS AND SIGNS

11: BUS BAR MODULE
13: BATTERY ASSEMBLY
15: BATTERY CELL
17: ELECTRIC WIRE ROUTING STRUCTURE
19: ELECTRIC WIRE
21: ELECTRIC WIRE ROUTING GROOVE
23: LID
25: ENGAGING PAWL (ENGAGED PORTION)
27: PAWL RECEIVING PORTION (ENGAGING PORTION)
29: SUB-ENGAGING PAWL (SUB-ENGAGED PORTION)
31: SUB-PAWL RECEIVING PORTION (SUB-ENGAGING PORTION)
33: PROTRUSION WALL
35: BUS BAR
49: FIRST SIDE WALL
51: SECOND SIDE WALL
55: HINGE
57: OPENING/CLOSING SIDE EDGE
59: OUTER SURFACE
81: SUPPORT SIDE EDGE
83: OUTER SURFACE

What is claimed is:

1. A bus bar module comprising:
an electric wire routing structure that is attached to a battery assembly including a plurality of battery cells and accommodates a plurality of bus bars in which each electrode of the battery cells is electrically connected to each other;
a plurality of electric wires connected to the battery cells via the bus bars, respectively;
an electric wire routing groove formed in the electric wire routing structure and accommodating the electric wires in a pair of side walls;
a first lid that is supported by a first side wall via a first hinge and covers the electric wire routing groove to block a groove opening;
an engaged portion formed on an opening/closing side edge of the first lid opposite to the first hinge;
an engaging portion formed on an outer surface of a second side wall and with which the engaged portion is engaged;

a sub-engaged portion formed on a support side edge of the first lid forming the first hinge;

a sub-engaging portion formed on an outer surface of the first side wall and with which the sub-engaged portion is engaged;

a protrusion wall protruding from an inner surface of the first side wall opposite to the sub-engaging portion to the second side wall; and a second lid that is supported by the first side wall via a second hinge and covers the electric wire routing groove, a second engaged portion formed on an opening/closing side edge of the second lid opposite to the second hinge;

a second engaging portion formed on the outer surface of the second side wall and with which the second engaged portion is engaged;

a second sub-engaged portion formed on a support side edge of the second lid forming the second hinge; and a second sub-engaging portion formed on the outer surface of the first side wall and with which the second sub-engaged portion is engaged, wherein the first lid and the second lid are arranged side-by-side along an extending direction of the electric wire routing groove.

2. The bus bar module according to claim 1, wherein a pair of the engaged portion and the engaging portion, and a pair of the sub-engaged portion and the sub-engaging portion are formed in different positions in the extending direction of the electric wire routing groove.

3. The bus bar module according to claim 1, wherein the bus bar module forms a power supply unit that is used in either a hybrid vehicle or an electric vehicle.

4. The bus bar module according to claim 1, wherein the electric wire routing structure includes a bus bar accommodation portion that is integrally formed of a synthetic resin, the electric wire routing groove, and a connecting groove.

5. The bus bar module according to claim 4, wherein the bus bar accommodation portion includes a bottom wall having a substantially rectangular shape that is substantially the same as that of the bus bar and a peripheral wall portion that vertically extends from a periphery of the bottom wall, and the bus bar accommodation portion is formed in a substantially vessel shape.

6. The bus bar module according to claim 1, wherein a plurality of bus bar accommodation portions are disposed in a row such that a longitudinal direction thereof follows a disposition direction of the plurality of battery cells, and are connected to each other through connecting members.

7. The bus bar module according to claim 1, wherein the second hinge extends from and is connected to each of the first side wall and the second lid, and wherein the first hinge extends from and is connected to each of the first side wall and the first lid.

* * * * *